United States Patent
Bonderer et al.

(10) Patent No.: US 11,667,053 B2
(45) Date of Patent: Jun. 6, 2023

(54) SUPPORT MATERIAL FOR ENERGY-PULSE-INDUCED TRANSFER PRINTING

(71) Applicants: Ivoclar Vivadent AG, Schaan (LI); IO Tech Group Ltd, London (GB)

(72) Inventors: Lorenz Josef Bonderer, Sargans (CH); Jürgen Rudolf Laubersheimer, Buchs (CH); Wolfgang Josef Wachter, Schaan (LI); Michael Zenou, Hasmonaim (IL)

(73) Assignees: Ivoclar Vivadent AG, Schaan (LI); IO Tech Group Ltd., London (GB)

( * ) Notice: Subject to any disclaimer, the term of this patent is extended or adjusted under 35 U.S.C. 154(b) by 627 days.

(21) Appl. No.: 16/675,294

(22) Filed: Nov. 6, 2019

(65) Prior Publication Data
US 2020/0171700 A1 Jun. 4, 2020

(30) Foreign Application Priority Data
Nov. 29, 2018 (EP) .................................. 18209276

(51) Int. Cl.
| | | |
|---|---|---|
| *B28B 1/00* | (2006.01) | |
| *B33Y 10/00* | (2015.01) | |
| *B33Y 30/00* | (2015.01) | |
| *B33Y 40/00* | (2020.01) | |
| *B33Y 70/00* | (2020.01) | |
| *B29C 64/165* | (2017.01) | |
| *B28B 11/24* | (2006.01) | |
| *C08K 5/3465* | (2006.01) | |
| *C08L 71/02* | (2006.01) | |
| *C08L 91/06* | (2006.01) | |
| *B29K 509/02* | (2006.01) | |

(52) U.S. Cl.
CPC ............ *B28B 1/001* (2013.01); *B28B 11/243* (2013.01); *B29C 64/165* (2017.08); *B33Y 10/00* (2014.12); *B33Y 30/00* (2014.12); *B33Y 40/00* (2014.12); *B33Y 70/00* (2014.12); *C08K 5/3465* (2013.01); *C08L 71/02* (2013.01); *C08L 91/06* (2013.01); *B29K 2509/02* (2013.01)

(58) Field of Classification Search
CPC ..... B28B 1/001; B28B 11/243; B29C 64/165; B33Y 10/00; B33Y 30/00; B33Y 40/00; B33Y 70/00; C08K 5/3465; C08K 3/04; C08L 71/02; C08L 91/06; B29K 2509/02

USPC .............................................................. 520/1
See application file for complete search history.

(56) References Cited

U.S. PATENT DOCUMENTS

| | | | |
|---|---|---|---|
| 5,877,232 A | 3/1999 | Storch et al. | |
| 6,043,361 A | 3/2000 | Evans et al. | |
| 6,096,903 A | 8/2000 | Moszner et al. | |
| 6,344,556 B1 | 2/2002 | Evans et al. | |
| 6,479,592 B2 | 11/2002 | Rheinberger et al. | |
| 6,908,953 B2 | 6/2005 | Weinmann et al. | |
| 7,137,697 B2 | 11/2006 | Lehmann | |
| 7,176,253 B2 | 2/2007 | Xu et al. | |
| 7,585,901 B2 | 9/2009 | Moszner et al. | |
| 7,927,538 B2 | 4/2011 | Moszner et al. | |
| 8,133,831 B2 | 3/2012 | Laubersheimer et al. | |
| 8,460,451 B2 | 6/2013 | Xu et al. | |
| 9,138,981 B1 | 9/2015 | Hirsch et al. | |
| 9,387,056 B2 | 7/2016 | Wachter et al. | |
| 9,532,930 B2 | 1/2017 | Burtscher et al. | |
| 2001/0032567 A1* | 10/2001 | Ikoma .................... | C09D 11/18 106/31.86 |
| 2002/0197401 A1 | 12/2002 | Auyeung et al. | |
| 2013/0176699 A1 | 7/2013 | Tonchev et al. | |
| 2018/0243176 A1 | 8/2018 | Bonderer et al. | |

FOREIGN PATENT DOCUMENTS

| | | | |
|---|---|---|---|
| CA | 2207351 A1 | 12/1997 | |
| CA | 2296227 A1 | 7/2000 | |
| WO | 02092674 A1 | 11/2002 | |
| WO | WO 2016/124712 | * | 8/2016 |

OTHER PUBLICATIONS

Herbst, W., et al., "Industrial Organic Pigments: Production, Properties, Application," Second completely revised edition, Weinheim, 1995.

Zenou, M. et al., "Laser Transfer of Metals and Metal Alloys for Digital Microfabrication of 3D Objects," Small Journal, 2015, 11, No. 33, pp. 4082-4089. Wiley-VCH Verlag GmbH & Co. KGaA, Weinheim.

* cited by examiner

*Primary Examiner* — Doris L Lee
(74) *Attorney, Agent, or Firm* — Ann M. Knab; Thad McMurray

(57) ABSTRACT

The invention relates to a material for use as support material for energy-pulse-induced transfer printing, which contains (a) at least one energy transformation component, (b) at least one volume expansion component and (c) at least one binder and which has a viscosity at 25° C. of from 0.2 Pas to 1000 Pas and a surface tension at 25° C. of from 20 to 150 mN/m. The invention furthermore relates to a process for producing three-dimensional objects using the support material.

2 Claims, No Drawings

SUPPORT MATERIAL FOR ENERGY-PULSE-INDUCED TRANSFER PRINTING

CROSS-REFERENCE TO RELATED APPLICATIONS

This application claims priority to European Patent Application No. 18209276.7 filed on Nov. 29, 2018, the disclosure of which is incorporated herein by reference in its entirety.

TECHNICAL FIELD

The invention relates to processes and compositions which are suitable for producing support material for three-dimensional objects by energy-pulse-induced transfer printing. The materials and processes are particularly suitable for producing dental restorations.

BACKGROUND

The term Additive Manufacturing (AM) combines additive manufacturing processes in which three-dimensional models or components are produced from computer-aided design data (CAD data). Known AM processes are e.g. stereolithography (SL), selective laser sintering (SLS), 3D printing, fused deposition modelling (FDM), inkjet printing (IJP), 3D plotting, multi-jet modelling (MJM), solid freeform fabrication (SFF), laminated object manufacturing (LOM), laser powder forming (LPF) and direct ceramic jet printing (DCJP). With these processes, models, components and shaped parts can be produced cost-effectively even in small batches.

EP 1 268 211 B1 and corresponding U.S. Pat. No. 7,137,697, which is hereby incorporated by reference, disclose a printing process in which a volumetric or positional change is induced by a focused laser beam locally in the material to be printed, with the result that an ink droplet detaches from the substantially homogeneous ink layer and is transferred onto the printing substrate. This process is called a laser induced forward transfer (LIFT) process. The material to be printed is transferred from the so-called donor or carrier substrate onto the receiver substrate (acceptor). The carrier substrate consists of a carrier which is coated with a thin layer of the material to be printed. This material layer is irradiated in a punctiform manner with a laser and thereby softened or melted and partially evaporated. In the case of transparent carriers the laser can be focused from the back through the carrier onto the material to be printed. If the carrier is not transparent, the carrier is heated by the laser and the material is indirectly softened or melted. Alternatively, the laser can be directed onto the material directly from above. The receiver substrate (printing substrate) is arranged at a small distance from the carrier substrate, which is to be maintained precisely. A part of the material to be printed is evaporated abruptly by the laser energy. The vapour cloud forming entrains a small quantity of the softened or melted material and deposits it on the receiver substrate.

In order to evaporate the material to be printed, the laser light must be absorbed and converted into heat. In the case of printing inks, the laser beam is usually absorbed by colour pigments which are contained in the inks. Alternatively, an absorption layer can be provided, which absorbs the laser light and then transfers the energy to the material to be printed. Such an absorption layer is usually arranged between the carrier and the material to be printed. Absorption layers are disadvantageous because parts of this layer are often transferred onto the receiver substrate together with the printing ink.

Zenou et al., small 2015, 11, No. 33, 4082-4089 describe the production of three-dimensional metal objects using the LIFT process. For this, they use metal-coated glass plates as carrier substrate. The metal is melted by a laser and transferred dropwise onto the receiver substrate. Three-dimensional metal structures are obtained by printing many layers one over another.

One problem in the production of three-dimensional structures is the printing of self-supporting structures or undercuts because the material to be printed can only be printed on a solid substrate. In such cases the use of so-called support materials, with which the area of the later overhang is printed, is usual. After the completion of the structure the support material is removed from the printed body. Zenou et al. use silver-containing copper alloys, which can be chemically dissolved out of the body formed by copper, as support material.

A similar object is to be achieved in the case of the PolyJet process or 3D inkjet printing on the basis of the selective deposition of material droplets. U.S. Pat. No. 9,138,981 B1, which is hereby incorporated by reference, discloses support materials for 3D inkjet printing which contain a glycol polymer, a polar substance with low molecular weight and a surfactant. Among others, polyethylene glycols are used as glycol polymer. Preferred polar substances are diols or polyols such as 1,8-octanediol. The materials preferably have a surface tension of 27-33 mN/m. The surface tension is set by the addition of the surfactant. The materials are heated for the printing and have a viscosity of 10-20 cPs at 80° C. Once the printing process has ended, the support materials are detached from the printed body with water.

U.S. Pat. No. 8,460,451 B1, which is hereby incorporated by reference, discloses support materials for 3D printing which contain a wax component and a component for setting the viscosity. The wax component contains a mixture of a fatty alcohol and an ethoxylated fatty alcohol. The viscosity is preferably likewise set by ethoxylated fatty alcohols. As a further component, the support materials can contain a so-called phase change agent which is to accelerate the solidification of the support material after the printing. Preferred phase change agents are urethane waxes. The materials preferably have a viscosity of 9-14 cPs at 65° C.

U.S. Pat. No. 7,176,253, which is hereby incorporated by reference, discloses support materials for inkjet processes which contain at least one fatty alcohol with a melting point of 50-65° C. and a solidification point of 45-55° C. and a resin ester. The materials have a viscosity of 10-19 cPs at 80° C.

Non-metallic support materials for the LIFT process are not known from the state of the art.

SUMMARY

The object of the invention is to avoid the named disadvantages. In particular the object of the invention is to provide compositions which are suitable as support materials for printing processes which operate according to the LIFT principle and which are suitable in particular for producing dental restorations.

DETAILED DESCRIPTION

A further object of the invention is to provide a process for producing three-dimensional objects according to the LIFT principle, with which structures with overhangs and/or undercuts can be produced. The process is to be suitable in particular for producing dental restorations.

In addition, different materials are to be able to be processed together to form an object. The support materials therefore have to blend well with a variety of different materials to be printed.

This object is achieved according to the invention by support materials which contain
  (a) at least one energy transformation component,
  (b) at least one volume expansion component and
  (c) at least one binder.

Non-metallic substances which are solid in pure form at room temperature are suitable in particular as binder. The binder primarily carries out the support function.

This object is furthermore achieved by an additive process for producing three-dimensional objects, which preferably comprises the following steps:
  (1) laminar application of a support/construction material to a carrier in a defined layer thickness, preferably in a layer thickness of 3-300 µm, particularly preferably 10-100 µm,
  (2) transfer of a portion of the support/construction material from the carrier substrate (donor) onto a receiver substrate (acceptor) by the local, site-selective input of an energy pulse, preferably a laser pulse,
  (3) solidification of the support/construction material on the receiver substrate, preferably by drying, radiation curing or altering the aggregation state (e.g. by temperature change),
  (4) repetition of steps (1)-(3) until the desired object has been constructed,
  (5) optionally removal of the support material and optional cleaning of the object,
  (6) optional post-curing of the object by further curing, preferably by drying, radiation, heat or a combination thereof,
  (7) optionally debinding and/or sintering of the object,
  (8) optional mechanical processing of the object, e.g. by vibratory finishing or manual processing such as grinding and/or polishing.

Steps (1) to (3) are repeated until the desired object is completed. According to a preferred embodiment the support/construction material is smoothed following step (3), preferably with a roller, blade, burr and/or a wiper. The object is then processed further in steps (5) to (8), wherein steps (6) to (8) are optional.

The support material is removed from the finished object. This can be effected either in a separate process step (5) or during the debinding or sintering in step (7).

In step (6) any uncured portions of the binder are cured, preferably by irradiation with light, particularly preferably with visible or UV light. This form of after-treatment comes into consideration in particular when the binder is cured in step (3) by irradiation with light, preferably with visible or UV light.

Step (7) is carried out in particular to produce objects made of ceramic or glass ceramic. In this case a green body is obtained in step (5) or step (6), which is converted into a ceramic object by debinding and sintering. As various process steps are optional, the actual number of process steps, and thus the numbering of the individual steps, can vary.

One or more different support materials and/or one or more different construction materials can be used in the process.

Preferred carriers in step (1) are polymer films, preferably with a thickness of 10-200 µm, in particular PET, polyimide and polyvinyl chloride (PVC) films; glass carriers, preferably made of float glass or borosilicate glass; carriers made of non-metallic, inorganic, porous or non-porous materials; metallic carriers, preferably made of stainless steel, aluminium, titanium alloys, copper alloys such as bronze or brass; carriers made of non-metallic, inorganic materials such as ceramic carriers, preferably made of $ZrO_2$, $Al_2O_3$, zirconia-toughened alumina (ZTA), alumina-toughened zirconia (ATZ), $SiC_x$, $SiN_x$, diamond-like carbon, glassy carbon, BN, $B_4C$ or AlN; or carriers made of a combination of these materials. The carriers are chosen such that they behave sufficiently inertly vis-á-vis the support/construction material, i.e. in particular are not perceptibly swollen or corroded by the support or construction material within the application time.

The carrier can be present as a plate, single-use tape, endless tape, cylinder or hollow cylinder. The work surface can be flat or curved. Curved surfaces are preferably curved about an axis, like e.g. the lateral surface of a cylinder.

The support/construction material can be applied to the carrier in a known manner, preferably by scraper or doctor-blade systems, with slot nozzles (with or without dispenser), by flexographic or gravure printing, screen printing, pad printing, spray coating or by a combination of these processes. In general all the printing methods known in the state of the art are suitable for this. The coated carrier is also called carrier substrate herein.

In the case of printing cylinders the support/construction material is preferably deposited continuously onto a rotating cylinder. Through the rotation the layer of the material formed on the cylinder is transported in the direction of the energy source, e.g. the laser, and printed there. The printed material is then added to again during further rotation.

Carrier films can likewise be used in continuous processes, for example by forming them as a circulating tape. However, the coated films can also be ready-made for single use.

In step (2) a part of the energy introduced is absorbed by the support/construction material and converted into heat. The absorption preferably takes place in the support/construction material itself without an additional absorption layer on the carrier substrate, with the result that the disadvantages associated with such absorption layers are avoided.

The energy absorption brings about a local, abrupt volume expansion, for example an evaporation, of the volume expansion component in the material and leads to the detachment of the support/construction material from the carrier substrate and to the transfer onto the receiver substrate. Droplets of the support/construction material are transferred onto the receiver substrate, where they can coalesce and form, for example, a homogeneous film.

The energy input in step (2) is preferably effected via the side of the carrier substrate facing away from the support/construction material.

The receiver substrate can have a flat surface and should be at least large enough to accommodate the whole of the component to be printed. The receiver substrate preferably has a smooth surface, which can be closed or porous. By a porous surface is meant a surface which has pores with an average size of preferably 1 nm-10 µm. The pore size is determined using scanning electron microscopy by counting. The average values obtained in the process are specified.

Examples of materials with micro- or nanoporous surface are set, dry gypsum and partially sintered but still porous $ZrO_2$, nanoporous glass or microporous plastics, such as e.g. high-density polyethylene sintered together.

The use of porous receiver substrates can promote the drying of the support and construction materials, particularly those construction materials that contain solid particles, such as slips for the production of ceramic objects. Particularly when the solidification takes place through drying, a separate drying step can be omitted. However, it is to be ensured that the pores are smaller than the solid filler particles, so that they do not clog the pores during the drying.

By support materials is meant materials which are removed from the finished object. Construction materials, in contrast, are materials which form the object and which remain after the removal of the support material. The term "support/construction material" is to be understood as meaning that either a support material or a construction material is printed or that both materials are used together. Support and construction materials together are also called printing materials herein.

The desired three-dimensional objects are produced by repeated layered printing of support and construction material. The individual layers can in each case be formed by the support material alone, by the construction material alone or by both materials together.

Continuous layers which are formed exclusively by the support material are by nature arranged such that they lie outside the finished object, i.e. for example on top of or underneath the object.

Support and construction materials can be printed together in one work step or one after another. For example, in a first work step a support material can be printed and then the construction material can be printed in or on the solidified support structure in the described manner. The deposited layer thicknesses of the support material and of the construction material can be different.

It can thereby become necessary, e.g., for the number of deposited layers to be different for support material and for construction material. According to a preferred embodiment several layers of at least one support material are first deposited on the receiver substrate. Then the desired object is formed by printing at least one construction material. Once the actual component has been completed, further layers of the support material can be applied, with the result that the top and bottom side of the printed object are delimited by one or more layers of the support material. In a particularly preferred embodiment the outer edge around the construction object in each layer is formed by the support material, with the result that the finally printed object is surrounded on all sides by support material. Thicker layers can be used in areas of the component in which the cross section does not change greatly, while thinner layers are preferred at points in which the component cross section changes rapidly.

In preparation for the next depositing cycle, the applied material layer can optionally be smoothed in a further process step, for example with a metal roller, a blade, a wiper or a burr with/without material suction.

The layered application is continued until the desired three-dimensional object is completed. The printing process is controlled by a computer by means of CAD data, as is usual in additive manufacturing processes. Construction material is used in the areas which form the shaped part and the support material is used underneath overhangs, on the sides of the component and in cavities.

In a preferred embodiment of the process the printing material, i.e. support or construction material, is applied to the carrier during the printing process. Alternatively, substrates already coated in advance can also be used, preferably in the form of coated carrier films. New printing material for the LIFT process is preferably provided by renewed, selective or continuous coating of the carrier substrate.

The process according to the invention is preferably a LIFT process. By a LIFT process is meant here a process in which, as explained at the beginning, a small quantity of material is extracted from a printing material by an energy pulse and transferred onto a receiver substrate. The energy pulse is preferably generated by a laser. The laser beam is focused onto a small area of the support or construction material and the support or construction material is hereby heated locally so strongly that the volume expansion component expands abruptly, e.g. due to evaporation of a portion of the printing material. The energy transformation component absorbs the laser energy and transfers this to the volume expansion component. The abruptly evaporating volume expansion component entrains the support or construction material and transfers it onto the receiver substrate. It is also possible for the volume expansion component to absorb a part of the energy directly.

According to the invention, instead of a laser beam, another suitable energy source can be used, for example focused light (not laser) or particle beams such as electron or ion beams. For the sake of simplicity the term LIFT process is also used here for processes in which no laser is used. Lasers are preferred, in particular lasers with a wavelength of from 300 nm to 4000 nm, for example neodymium: YAG lasers with a wavelength of 1064 nm. Pulsed laser light with a pulse energy in the μJ range and a pulse duration of from 1 ns to 1 μs is particularly preferred.

The energy transformation component (a) in the support material is tuned to the wavelength of the laser light to be absorbed. According to the invention inorganic and in particular organic dyes and pigments are preferred as energy transformation component. Dyes and colour pigments which can combust residue-free and which leave no residues behind on the final component after a possible debinding/sintering process for e.g. ceramic components are particularly preferred.

In addition, dyes and pigments which absorb in the wavelength range of the radiation source used, preferably laser, are preferred. For example, for a neodymium: YAG laser with a wavelength of 1064 nm the following dyes/pigments are particularly preferred: Carbon Black, Sudan Black B (CAS 4197-25-5), Bismarck Brown Y (CAS 10114-58-6), 1-butyl-2-[2-[3-[(1-butyl-6-chlorobenz[cd]indol-2(1H)-ylidene)ethylidene]-2-chloro-1-cyclohexen-1-yl]ethenyl]-6-chlorobenz[cd]indolium tetrafluoroborate (CAS 155613-98-2) or Safranin 0 (CAS 477-73-6). Carbon Black, Sudan Black B (CAS 4197-25-5) and Safranin 0 (CAS 477-73-6) are quite particularly preferred.

For a green laser, e.g. with a wavelength of 532 nm, the following dyes/pigments are preferred: Carbon Black, Sudan Red 7B (Oil Violet CAS 6368-72-5), Sudan IV (CAS 85-83-6), Sudan Red G (CAS 1229-55-6), Pigment Red 144 (CAS 5280-78-4), Safranin 0 (CAS 477-73-6).

For a blue laser, e.g. with a wavelength of 405 nm, the following dyes/pigments are preferred: Carbon Black, Pigment Yellow 93 (CAS 5580-57-4), Sudan Yellow 146 (CAS 4314-14-1), Disperse Yellow 7 (CAS 6300-37-4).

The energy transformation component absorbs the bulk of the energy of the applied energy pulse, for example of the incident laser beam, and converts it into heat. The thus-generated heat pulse is transferred onto the volume expansion component and leads to its abrupt expansion, for example to the abrupt formation of microscopic gas bubbles due to evaporation of the volume expansion component. The transfer of the printing material from the carrier substrate onto the receiver substrate is induced hereby. The printing material is deposited on the receiver substrate.

The volume expansion component (b) has the main purpose of bringing about a transfer of the printing material from the carrier substrate onto the receiver substrate. In order that the absorbed energy leads to a controlled droplet formation, the volume expansion component is to be converted into the gas phase in the shortest time due to the heat pulse. A substance with a boiling point of 80-280° C. and particularly preferably of 95-200° C. is preferably used as volume expansion component (boiling points at standard pressure). Preferred substances are 1,8-octanediol and 1,6-hexanediol. Substances which are liquid at 25° C., in particular water and 1-octanol, are particularly preferred. Water has the advantage that no solvent vapours which are hazardous to health or potentially explosive form during the evaporation.

Further preferred substances which can be used as volume expansion component are propylene glycol diacetate, ethylene glycol diacetate, triethyl-2-acetyl citrate, triethyl citrate, adipic acid dimethyl ester, adipic acid diethyl ester, triethylene glycol, glutaric acid diethyl ester, glutaric acid dimethyl ester, diethyl succinate, acetic acid butyl ester, acetic acid n-hexyl ester. The volume expansion component is preferably matched to the binder used such that the viscosity, the surface tension and the homogeneity lie within the ranges defined herein. A homogeneity suitable according to the invention exists when there is no visible phase separation. For this, polar binders such as PEG, PVA are preferably combined with a polar volume expansion component such as e.g. water, and non-polar binders such as paraffin are preferably combined with a less polar volume expansion component such as 1-octanol.

Alternatively, solid, homogeneously dispersed organic substances which decompose abruptly into gases at temperatures of 80°-280° C., for example azobis(isobutyronitrile) (AIBN), can be used as volume expansion component.

Polymers, waxes and/or non-ionic surfactants which are solid at a temperature below 40° C. are preferably used as binder (c).

Polymers preferred according to the invention are glycol polymers, in particular polyethylene glycol (PEG), polypropylene glycol (PPG), PEG-PPG copolymers and PVA. Polyethylene glycol (PEG) with a molecular weight of 1500-10,000 g/mol is particularly preferred. Polymers such as polyacrylamide, polyvinylpyrrolidone, amylopectin, gelatin, cellulose, polymers based on polyacrylic acid and in particular copolymers of acrylic acid or sodium acrylate with acrylamide are further preferred. These polymers are polar and can form hydrogels. Polar polymers are particularly suitable for combination with a polar volume expansion component such as water.

In the present invention the term "wax" is to be understood as defined by the Deutsche Gesellschaft für Fettwissenschaft (German Society for Fat Science) in DGF standard method MI1 (75). As the chemical composition and origin of different waxes vary greatly, waxes are defined via their mechanical-physical properties. A substance is called a wax if it is kneadable, solid to brittle hard, has a coarse to fine-crystalline structure, is translucent to opaque in terms of colour but is not glassy at 20° C.; above 40° C. it melts without decomposition, is readily liquid even slightly above the melting point (low-viscosity) and not stringy; has a strongly temperature-dependent consistency and solubility, and can be polished under slight pressure. Waxes typically change into the molten state between 40° C. and 130° C.; as a rule waxes are insoluble in water. Waxes for use in the support material according to the invention preferably have a melting point in the range of from 40 to less than 80° C., particularly preferably of from 45 to 65° C.

Waxes are divided into three main groups depending on their origin, namely natural waxes, wherein here a distinction is in turn made between plant and animal waxes, mineral waxes and petrochemical waxes; chemically modified waxes and synthetic waxes. The wax used as binder in the support material according to the invention can consist of one wax type or also of mixtures of different wax types.

In the present invention petrochemical waxes are preferably used, such as for instance paraffin wax (hard paraffin), petrolatum, microcrystalline wax (micro paraffin) and mixtures thereof, particularly preferably paraffin wax. Paraffin waxes which are commercially available as injection-moulding binders for manufacturing oxide-ceramic and non-oxide-ceramic components in the hot-casting process (low-pressure injection moulding) are very suitable, e.g. paraffin wax with a melting point of approx. 54-56° C., a viscosity of 3-4 mPa·s at 80° C. Commercially available waxes often already contain emulsifiers and/or further components for adapting the rheology.

Plant waxes, e.g. candelilla wax, carnauba wax, Japan wax, esparto wax, cork wax, guaruma wax, rice bran wax, sugarcane wax, ouricury wax, montan wax; animal waxes, e.g. beeswax, shellac wax, spermaceti, lanolin (wool wax), rump fat; mineral waxes, e.g. ceresin, ozokerite (earthwax); chemically modified waxes, e.g. montan ester waxes, sasol waxes, hydrogenated jojoba waxes, or synthetic waxes, e.g. polyalkylene waxes, polyethylene glycol waxes, can also be used as wax.

Non-ionic surfactants are substances with interface-active properties which do not form ions in aqueous media. These are molecules which have a hydrophobic portion and a hydrophilic portion. The overall hydrophobicity of the molecules can be set through the choice of the length and type of the hydrophobic and hydrophilic portions.

Support materials which contain a surfactant with a melting point of from 40° C. to 120° C., preferably 45° C. to 80° C., as non-ionic surfactant (c) are preferred.

Preferred non-ionic surfactants are the ethoxylates of fatty alcohols, oxo alcohols or fatty acids, fatty acid esters of sugars and hydrogenated sugars, alkyl glycosides as well as block polymers of ethylene and propylene oxide, in particular short-chain block co-oligomers.

Fatty acid esters of hydrogenated sugars are particularly preferred, in particular those with the formula R'—CO—O-sugar, wherein R' is a branched or preferably straight-chain alkyl radical with 10 to 25 carbon atoms, preferably 12 to 22 carbon atoms. Straight-chain alkyl radicals with 15 to 22 carbon atoms are preferred. "Sugar" stands for a hydrogenated sugar radical which is preferably ethoxylated 0 to 5 times. Fatty acid esters of sorbitol are quite particularly preferred, in particular sorbitan stearates such as e.g. sorbitan monostearate (CAS 1338-41-6).

A further preferred group of surfactants are ethoxylates of fatty acids, in particular those with the general formula R"—(CO)—(OCH$_2$CH$_2$)m-OH, in which R" is a branched or preferably straight-chain alkyl radical with 10 to 25 carbon atoms, preferably 12 to 22 carbon atoms. Straight-chain alkyl radicals with 16 to 22 carbon atoms are particularly preferred. m is an integer from 0 to 20, preferably 0 to 10 and particularly preferably 0 to 6.

Surfactants quite particularly preferred according to the invention are fatty alcohols and ethoxylates of fatty alcohols, in particular polyalkylene glycol ethers with the general formula R—(OCH$_2$CH$_2$)n-OH, in which R is an alkyl radical with 10 to 20 carbon atoms and n is an integer from 0 to 25. R can be a branched or preferably straight-chain alkyl radical, wherein alkyl radicals with 12 to 25 carbon atoms and particularly straight-chain alkyl radicals with 12 to 22 carbon atoms are preferred. Quite particularly preferred alkyl radicals are lauryl, cetyl, cetearyl and stearyl. The polyalkylene glycol ethers can be obtained by reacting the corresponding fatty alcohols with ethylene oxide (EO). The index n indicates the number of ethylene oxide radicals. Polyalkylene glycol ethers with 0 to 21 (n=2–21), in particular 0 to 12 (n=2–12) and quite particularly 0 to 5 (n=2–5) ethylene oxide radicals are preferred. Examples of polyalkylene glycol ethers preferred according to the invention are compounds in which R is a cetyl radical (C$_{16}$ radical) and n is 20 and in particular 2. These compounds have the INCI names Ceteth-2 and Ceteth-20. Ceteth-2 has e.g. the formula C$_{16}$H$_{33}$—(OCH$_2$CH$_2$)$_2$—OH. Compounds in which R is a stearyl radical (C$_{18}$ radical) and n is 2, 10, 20 or are further preferred. These compounds have the INCI names Steareth-2, Steareth-10, Steareth-20 and Steareth-21. Steareth-2 has e.g. the formula C$_{18}$H$_{37}$—(OCH$_2$CH$_2$)$_2$—OH. Quite particularly preferred non-ionic surfactants are Steareth-20, Steareth-10, Ceteth-20 and in particular Steareth-2 and Ceteth-2. Mixtures of different non-ionic surfactants and in particular different polyalkylene glycol ethers can likewise be used.

Binders with a melting point between 40° C. and 200° C., particularly preferably 50° C. to 80° C., are preferred, wherein those binders which do not decompose thermally during melting are particularly preferred. In the melted state the binder preferably has a viscosity of below 100 Pas, particularly preferably below 20 Pas and quite particularly preferably below 5 Pas, so that it can be easily removed from the component. The binder should be combustible as residue-free as possible. It is important that the support material in the solid state has a sufficient strength to be able to support the printing material correspondingly.

The support materials according to the invention can additionally contain one or more further surfactants to set the surface tension and to set the interfacial tension between support material and carrier, between support material and receiver and between support material and construction material. Through the setting of surface tension and interfacial tension it is ensured that the layer of the support material applied to the carrier does not contract (bulging effect), that it forms a homogeneous layer on the receiver and that the construction material does not contract on the support material (bulging effect). Preferred surfactants for setting the surface tension and interfacial tension are ionic surfactants (e.g. stearic acid), amphoteric surfactants (e.g. N,N,N-trimethylammonioacetate) and preferably the above-named non-ionic surfactants, wherein fatty alcohol ethoxylates (FAEO) and polyalkylene glycol ethers are particularly preferred. In addition to the interface-adapting function, certain surfactants, particularly the above-defined non-ionic surfactants, also have a support function.

The support materials according to the invention preferably have a viscosity of from 0.2 Pas to 1000 Pas and preferably a surface tension of from 20 to 150 mN/m, preferably 30 to 100 mN/m and particularly preferably 40 to 90 mN/m.

Unless otherwise indicated, the viscosity of the support materials is measured with an Anton Paar rheometer with CP50-1 cone-plate measuring equipment at a shear rate of 100/s and at a temperature of 25° C.

The surface and interfacial tension is determined, unless otherwise indicated, according to DIN 55660-1 to -7 or DIN 53914 (Determining the surface tension of surfactants) at 25° C.

In order to support the formation of a homogeneous layer of the support or construction material, support/construction material and carrier are preferably matched to each other. A low interfacial tension between support/construction material and carrier is sought. For hydrophilic support/construction materials, hydrophilic carrier and/or receiver substrates are preferably used, for example glass carriers, cellophane or hydrophilic PET films.

Surfaces can be hydrophilized e.g. by flame, plasma or etching treatments. In general the printing material is to wet the carrier well. The wetting can likewise be improved by the addition of a surfactant to the printing material. As aqueous support materials are preferred according to the invention, hydrophilic carriers are preferred. In the case of hydrophobic support/construction materials, hydrophobic carriers are preferred.

To achieve optimal printing results, it is necessary to match the type and quantities of the components used in the support material. According to the invention it has been found that the named substances can be mixed well with each other and homogeneous compositions result. The quantitative proportions of the components can be varied within wide ranges, with the result that the viscosity and the surface tension can be set in a targeted manner.

Ideally the volume expansion component should already evaporate to a largely during the printing process, or respectively during the droplet generation and droplet transfer, with the result that the droplets striking the receiver contain as little of it as possible.

In this way a drying or solidification of the printed layers is accelerated and a separate drying step is ideally made superfluous. Moreover, a volume shrinkage of the printed layers during the drying is minimized, shrinkage cracks are prevented and the danger that already printed support material is dissolved again by newly deposited droplets is reduced.

The volume expansion component is therefore preferably used in as small as possible a quantity. Through the type and quantity of the volume expansion component the drying kinetics are matched to the process such that on the one hand the material film on the carrier substrate does not dry too quickly and contains sufficient volume expansion component to bring about the desired transfer of the material onto the receiver substrate. On the other hand the volume expansion component is to evaporate as much as possible during the transfer. The binder is transferred onto the receiver substrate by the expansion of the volume expansion component. There, it solidifies again rapidly by vaporization of the volume expansion component and/or solidification after the melting during the droplet generation and exhibits a good adhesion to the receiver substrate or previously formed layers.

The type and quantity of the volume expansion component are preferably chosen such that the proportion of the volume expansion component reduces from the material depositing on the carrier until the time of the energy input to such an extent that the material contains only as much volume expansion component as is necessary for the droplet generation and coalescence of the droplets on the receiver substrate, so that the volume shrinkage during the drying is as small as possible.

In addition to the named substances, the support materials according to the invention can preferably contain one or more additives. Preferred additives are stabilizers such as methylhydroquinone (MEHQ) and 2,6-di-tert-butyl-p-cresol (BHT); rheology modifiers such as polyvinyl alcohol, hydroxyethyl cellulose, carboxymethyl cellulose, polyvinylpyrrolidone; fragrances, such as 2-benzylideneheptanal (amyl cinnamaldehyde), ethyl 2-naphthyl ether and essential oils; and fillers. Organic fillers which combust residue-free are preferred. Furthermore, antimicrobial substances such as polyformaldehyde, parabens such as hydroxybenzoic acid methyl ester come into consideration as additives.

By fillers is meant substances which are and remain solid during the entire process, whereas binders exhibit a phase transition in the course of the process, e.g. from solid to liquid and back to solid, preferably from dissolved to solid.

The formation of droplets with a defined size without the formation of so-called "satellites" is essential for a reproducible printing process. By satellites is meant smaller droplets which form in addition to the "main droplet" and impair the print quality. The droplet formation is influenced decisively by temperature, airflow and the time between the application of the carrier layer by scraper and the droplet generation. The dimensional stability of the support material layer on the receiver under thermal load and the property change are furthermore important for the accuracy of the printing process.

The support materials according to the invention preferably contain:

0.05 to 30 wt.-%, particularly preferably 0.05 to 20 wt.-%, energy transformation component (a), to 60 wt.-%, particularly preferably 8 to 50 wt.-%, volume expansion component (b), 35 to 94.95 wt.-%, particularly preferably 40 to 90 wt.-% and quite particularly preferably 49 to 90 wt.-%, binder (c)

Unless otherwise indicated, all quantities are relative to the total mass of the composition.

The materials according to the invention are particularly suitable for use as support material in a LIFT process. They should preferably behave inertly in combination with the construction materials used. The construction materials are printed together, preferably sequentially, with the support material.

Support materials which in the solidified state contain no components which react with the construction material used are preferred according to the invention. That would make it more difficult to remove the support materials from the shaped body. In general, those support materials which exclusively contain organic components are preferred.

The advantage of the LIFT process according to the invention is that a wide variety of materials can be deposited selectively and, after the material has been applied can independently cure or solidify according to their properties or can be cured or solidified by an additional process step.

To manufacture dental products, the following construction materials are preferred:

According to an embodiment, filled and unfilled reactive construction materials which can be cured by polymerization after selective depositing are preferred. In particular, photoreactive materials are preferred. The materials described in EP 2 151 214 B1 and corresponding U.S. Pat. No. 7,927,538, which is hereby incorporated by reference, are particularly preferred.

Quite particularly preferred reactive construction materials are materials which contain ($\alpha$) at least one polymerizable binder, preferably a radically polymerizable binder, ($\beta$) at least one volume expansion component, ($\gamma$) at least one initiator for the polymerization, preferably an initiator for the radical polymerization, particularly preferably a photoinitiator, and ($\delta$) preferably at least one energy transformation component.

The process according to the invention is characterized in that a material which preferably contains a radically polymerizable binder as binder ($\alpha$) is used as construction material.

Mono- or multifunctional (meth)acrylates or mixtures thereof are particularly suitable as radically polymerizable binders ($\alpha$). By monofunctional (meth)acryl compounds is meant compounds with one, by multifunctional (meth)acryl compounds is meant compounds with two or more, preferably 2 to 3, polymerizable groups. Suitable examples are methyl, ethyl, 2-hydroxyethyl, butyl, benzyl, tetrahydrofurfuryl or isobornyl (meth)acrylate; p-cumylphenoxyethylene glycol methacrylate (CMP-1E); bisphenol A di(meth)acrylate; bis-GMA (an addition product of methacrylic acid and bisphenol A diglycidyl ether); ethoxylated or propoxylated bisphenol A dimethacrylate, such as e.g. the bisphenol A dimethacrylate with 3 ethoxy groups (SR-348c, from Sartomer); or 2,2-bis[4-(2-methacryloxypropoxy)phenyl]propane; UDMA (an addition product of 2-hydroxyethyl methacrylate and 2,2,4-trimethyl-hexamethylene diisocyanate); di-, tri- or tetraethylene glycol di(meth)acrylate; trimethylolpropane tri(meth)acrylate; pentaerythritol tetra(meth)acrylate; as well as glycerol di- and trimethacrylate; 1,4-butanediol di(meth)acrylate; 1,10-decanediol di(meth)acrylate (D3MA); or 1,12-dodecanediol di(meth)acrylate.

Preferred (meth)acrylate monomers are benzyl, tetrahydrofurfuryl or isobornyl methacrylate, p-cumyl-phenoxyethylene glycol methacrylate, 2,2-bis[4-(2-methacryloxypropoxy)phenyl]propane, bis-GMA, UDMA, SR-348c and D3MA.

N-mono- or N-disubstituted acrylamides such as e.g. N-ethylacrylamide or N,N-dimethacrylamide or bisacrylamides such as e.g. N,N'-diethyl-1,3-bis(acrylamido)propane, 1,3-bis(methacrylamido)propane, 1,4-bis(acrylamido)butane or 1,4-bis(acryloyl)piperazine can also be used as radically polymerizable binder ($\alpha$).

Furthermore, known low-shrinkage radically ring-opening polymerizable monomers, such as e.g. mono- or multifunctional vinylcyclopropanes or bicyclic cyclopropane derivatives (cf. DE 196 16 183 C2 or EP 1 413 569 A1), or cyclic allylsulphides (cf. U.S. Pat. No. 6,043,361 or U.S. Pat. No. 6,344,556, which are hereby incorporated by reference), which in addition can also be used in combination with the previously listed di(meth)acrylate crosslinkers, can be used as radically polymerizable binder ($\alpha$).

Moreover, radically polymerizable polysiloxanes, which can be produced from suitable methacryl silanes such as e.g. 3-(methacryloyloxy)propyltrimethoxysilane and are described e.g. in DE 199 03 177 C2, can be used as radically polymerizable binder ($\alpha$).

Mixtures of the above-named monomers are preferably used.

Alternatively, cationic monomers can be used as binder ($\alpha$), for example cationically ring-opening polymerizable monomers such as glycidyl ethers or cycloaliphatic epoxides, cyclic ketene acetals, spiro orthocarbonates, oxetanes or bicyclic orthoesters. Preferred examples are 2-methylene-1,4,6-trioxaspiro[2.2]nonane, 3,9-dimethylene-1,5,7,11-tetraoxaspiro[5.5]undecane, 2-methylene-1,3-dioxepane, 2-phenyl-4-methylene-1,3-dioxolane, bisphenol A diglycidyl ether, 3,4-epoxycyclohexylmethyl 3,4-epoxycyclohexanecarboxylate, bis(3,4-epoxycyclohexylmethyl)adipate, vinyl cyclohexene dioxide, 3-ethyl-3- hydroxymethyloxetane, 1,10-decanediyl-bis-(oxymethylene)-bis-(3-ethyloxetane) or 3,3-(4-xylylenedioxy)-bis-(methyl-3-ethyloxetane) as well as the epoxides named in EP 0 879 257 B1. Silicic acid polycondensates, which can be obtained for example by hydrolytic condensation of silanes which bear cationically polymerizable groups, preferably epoxide, oxetane or spiro orthoester groups, are also suitable as cationically polymerizable binders (α). Such silicic acid polycondensates are described for example in DE 41 33 494 C2 or U.S. Pat. No. 6,096,903. Moreover, vinyl ethers, such as e.g. ethyl or isobutyl vinyl ether, as well as N-vinylpyrrolidone, can be used as cationic monomers.

The reactive construction materials contain at least one reactive, preferably a radically polymerizable, volume expansion component (β). Low-boiling liquid monomers and in particular mono(meth)acrylates are preferred as volume expansion component (β). By low-boiling monomers is meant monomers with a boiling point of less than 200° C. at standard pressure. Methyl(meth)acrylate, ethyl(meth)acrylate, propyl(meth)acrylate, butyl(meth)acrylate, pentyl (meth)acrylate, hexyl(meth)acrylate and N,N-dimethylacrylamide are particularly preferred. Those substances which have a vapour pressure of at most 60 mbar, particularly preferably at most 40 mbar, at 20° C. are preferred.

The named volume expansion components are characterized in that, unlike unreactive components, they participate in the reaction during the curing of the materials and are incorporated into the polymer network. In clinical use, therefore, they are not dissolved out of the material, which is a significant advantage with regard to the production of dental restorations.

In addition, solid, homogeneously dispersed organic substances which decompose abruptly into gases at temperatures of 80°-280° C., for example azobis(isobutyronitrile) (AIBN), can be used as volume expansion component (β).

The reactive construction materials furthermore contain an initiator for the polymerization (γ), preferably an initiator for the radical polymerization and quite particularly preferably a photoinitiator for the radical polymerization, for example a photopolymerization initiator for the UV range, a photopolymerization initiator for the visible range or a mixture thereof.

The longest wavelength absorption maximum of the photopolymerization initiator (γ) for the UV range preferably lies at a wavelength of less than 400 nm, in particular in the range of from 300 to less than 400 nm, preferably in the range of from 330 to less than 400 nm, particularly preferably in the range of from 345 to less than 400 nm and most preferably in the range of from 360 to less than 400 nm.

The longest wavelength absorption maximum of the photopolymerization initiator (γ) for the visible range preferably lies at a wavelength of at least 400 nm, in particular in the range of from 400 to 600 nm, particularly preferably in the range of from 400 to 500 nm and most preferably in the range of from 420 to 480 nm.

The absorption spectra of the photopolymerization initiators can overlap within certain limits. The difference between the longest wavelength absorption maxima of the first and second photopolymerization initiators is preferably at least 5 nm, in particular at least 10 nm, most preferably at least 15 nm. Moreover it is preferred if the first photopolymerization initiator in the wavelength range of from 420 to 750 nm and in particular in the wavelength range of from 440 to 700 nm has a molar decadic absorption coefficient of less than 10 l/(mol·cm).

In particular phosphine oxides, benzoins, benzil ketals, acetophenones, benzophenones, thioxanthones as well as mixtures thereof are suitable as photopolymerization initiators (γ) for the UV range. Acyl- and bisacylphosphine oxides such as 2,4,6-trimethylbenzoyldiphenylphosphine oxide or bis-(2,4,6-trimethylbenzoyl)phenylphosphine oxide, benzoin, benzoin alkyl ether, benzil dialkyl ketals such as benzyl dimethyl ketal, α-hydroxyacetophenones such as 1-hydroxy-cyclohexyl-phenyl-ketone, 2-hydroxy-2-methyl-1-phenyl-1-propanone or 2-hydroxy-1-[4-(2-hydroxyethoxy)-phenyl]-2-methyl-1-propanone, α-dialkoxyacetophenones, α-aminoacetophenones such as 2-benzyl-2-(dimethylamino)-1-[4-(4-morpholinyl)-phenyl]-1-butanone or 2-methyl-1-[4-(methylthio)-phenyl]-2-(4-morpholinyl)-1-propanone, alkylthioxanthones such as i-propylthioxanthone as well as mixtures thereof are particularly suitable. Acyl- and bisacylphosphine oxides and in particular 2,4,6-trimethylbenzoyldiphenylphosphine oxide, bis-(2,4,6-trimethylbenzoyl)phenylphosphine oxide and mixtures thereof are particularly preferred.

In particular α-diketones, acylgermanium compounds, metallocenes as well as mixtures thereof are suitable as photopolymerization initiators (γ) for the visible range. α-Diketones such as camphorquinone, 9,10-phenanthrenequinone, 1-phenyl-propane-1,2-dione, diacetyl, 4,4'-dichlorobenzil or derivatives thereof, monoacyl- and diacylgermanium compounds such as benzoyltrimethylgermanium, dibenzoyldiethylgermanium or bis-(4-methoxybenzoyl)-diethylgermanium, titanocenes such as bis-($\eta^5$-2,4-cyclopentadien-1-yl)-bis-[2,6-difluoro-3-(1H-pyrrol-1-yl)phenyl]-titanium as well as mixtures thereof are particularly suitable. α-Diketones and in particular camphorquinone, 1-phenyl-propane-1,2-dione and mixtures thereof are particularly preferred. Monoacyltrialkyl- and diacyldialkylgermanium compounds and in particular benzoyltrimethylgermanium, dibenzoyldiethylgermanium, bis-(4-methoxybenzoyl)-diethylgermanium and mixtures thereof are likewise particularly preferred. Mixtures of at least one α-diketone and at least one acylgermanium compound are also quite particularly preferred.

α-Diketones are preferably used in combination with amine accelerators. Tertiary amines are usually used as amine accelerators. Tertiary aromatic amines such as N,N-dialkyl-anilines, N,N-dialkyl-p-toluidines or N,N-dialkyl-3,5-xylidines, p-(N,N-dialkylamino)-phenyl ethanols, p-(N,N-dialkylamino)-benzoic acid derivatives, p-(N,N-dialkylamino)-benzaldehydes, p-(N,N-dialkylamino)-phenylacetic acid esters or p-(N,N-dialkylamino)-phenylpropionic acid esters are suitable in particular. Specific examples of these are N,N-dimethylaniline, N,N-dimethyl-p-toluidine, 3,5,N,N-tetramethylaniline, p-(N,N-dimethylamino)-benzaldehyde, p-(dimethylamino)-benzoic acid ethyl ester and p-(dimethylamino)-benzonitrile as well as mixtures thereof. Tertiary aliphatic amines such as tri-n-butylamine, 2-dimethylaminoethanol, triethanolamine, dimethylaminoethyl methacrylate, N,N-dimethylbenzylamine, heterocyclic amines such as 1,2,2,6,6-pentamethylpiperidine, amino acid derivatives such as N-phenylglycine as well as mixtures thereof are also suitable. p-(Dimethylamino)-benzoic acid ethyl ester, dimethylaminoethyl methacrylate, N,N-dimethylaniline, N,N-dimethyl-p-toluidine, triethanolamine and mixtures thereof are particularly preferred. In particular those photopolymerization initiators which bleach during the introduction of radiation with an emission maximum at a wavelength of at least 400 nm and thus no longer have any disruptive intrinsic colour after the further curing are preferred here. This is true in particular for the named acylgermanium compounds.

In a preferred embodiment a mixture of at least one germanium compound with at least one α-diketone in combination with at least one amine accelerator is used as photopolymerization initiator (γ) for the visible range. Quite particularly preferred combinations of these photopolymerization initiators are described in EP 2 649 981 A1 and corresponding U.S. Pat. No. 9,532,930, which is hereby incorporated by reference.

The use of two or more photoinitiators which are active in different wavelength ranges is preferred. The first photoinitiator is active in the wavelength range which is used for the curing of the materials in step (3), the second initiator is active in the wavelength range which is used for the post-curing in step (6). Preferred initiator combinations are described e.g. in EP 2 751 618 A2 and corresponding U.S. Pat. No. 9,387,056, which is hereby incorporated by reference.

Reactive construction materials based on cationically polymerizable monomers can preferably be cured with the known cationic photoinitiators, particularly with diaryliodonium or triarylsulphonium salts, optionally in the presence of suitable sensitizers, such as e.g. camphorquinone, monoacyltrialkyl- or diacyldialkylgermanium compounds, such as e.g. benzoyltrimethylgermanium, dibenzoyldiethylgermanium or bis(4-methoxybenzoyl)diethylgermanium. Examples of suitable diaryliodonium salts which can be used with camphorquinone, monoacyltrialkyl- or diacyldialkylgermanium compounds or thioxanthones as sensitizer in the visible range are the commercially available substances 4-octyloxyphenylphenyliodonium hexafluoroantimonate and isopropylphenylmethylphenyliodonium tetrakis(pentafluorophenyl)borate.

The preferably also present energy transformation component (δ) is tuned to the wavelength of the laser light to be absorbed. Inorganic and in particular organic dyes and pigments are preferred as energy transformation component.

Dyes and pigments which absorb in the wavelength range of the radiation source used, preferably laser, are preferred in particular. For example, for a neodymium: YAG laser with a wavelength of 1064 nm the following dyes/pigments are particularly preferred: Carbon Black, Sudan Black B (CAS 4197-25-5), Bismarck Brown Y (CAS 10114-58-6), 1-butyl-2-[2-[3-[(1-butyl-6-chlorobenz[cd]indol-2(1H)-ylidene)ethylidene]-2-chloro-1-cyclohexen-1-yl]ethenyl]-6-chlorobenz[cd]indolium tetrafluoroborate (CAS 155613-98-2) or Safranin O (CAS 477-73-6). Carbon Black, Sudan Black B (CAS 4197-25-5) and Safranin O (CAS 477-73-6) are quite particularly preferred.

For a green laser, e.g. with a wavelength of 532 nm, the following dyes/pigments are preferred: Carbon Black, Sudan Red 7B (Oil Violet CAS 6368-72-5), Sudan IV (CAS 85-83-6), Sudan Red G (CAS 1229-55-6), Pigment Red 144 (CAS 5280-78-4), Safranin O (CAS 477-73-6). For a blue laser, e.g. with a wavelength of 405 nm, the following dyes/pigments are preferred: Carbon Black, Pigment Yellow 93 (CAS 5580-57-4), Sudan Yellow 146 (CAS 4314-14-1), Disperse Yellow 7 (CAS 6300-37-4).

In addition to the energy transformation component, the materials can advantageously contain further chromophoric components. Inorganic and organic pigments are preferred as chromophoric component, particularly heavy-metal-free, i.e. in particular Cd- and Pb-free, pigments. The most common inorganic pigments are those based on the various iron oxides, chromates and molybdates. Azo pigments, such as monoazo, disazo, benzimidazolone and isoindolonone pigments, as well as polycyclic pigments, such as phthalocyanine, thioindigo, flavanthrone, dioxazine and anthanthrone pigments, are mainly used as organic pigments. These substance classes are modified with respect to the colour shade and the colour depth through the use of different substituents. The production, use and properties of the most common organic pigments are described in detail in Herbst/Hunger, "Industrielle Organische Pigmente" [Industrial Organic Pigments], VCH-Verlagsgesellschaft [VCH publishing company], Weinheim, 1987.

Ultramarine blue, pigments based on iron oxide, titanium dioxide, cobalt oxide, aluminium oxide, chromium oxide, nickel oxide, zirconium oxide and/or zinc oxide, carbon black and organic coloured pigments are particularly suitable as pigments. Furthermore, organic pigments, such as for example red diazo condensation pigments, e.g. Microlith® red BR-T (from CIBA, Specialities), and yellow benzimidazolone pigments, e.g. PV Fast Yellow H2G 01 (from Hoechst), are suitable. The iron oxide pigments can have a red, yellow, brown or black colour. Preferred pigments are black iron oxide, brown iron oxide, yellow organic pigment, red organic pigment and titanium dioxide.

In addition to the named substances, the reactive construction materials can preferably contain further components, in particular one or more fillers, phase change agents, wetting agents, stabilizers and other additives.

Preferred fillers are organic or inorganic filler particles. Preferred inorganic particulate fillers are amorphous spherical materials based on oxides such as $ZrO_2$ and $TiO_2$ or mixed oxides of $SiO_2$, $ZrO_2$ and/or $TiO_2$ with a mean average particle size of from 0.005 to 2 μm, preferably 0.1 to 1 μm, nanoparticulate or microfine fillers such as pyrogenic silica or precipitated silica with a mean average particle size of from 5 to 200 nm, preferably 10 to 100 nm, minifillers such as quartz, glass ceramic or glass powder with an average particle size of from 0.01 to 10 μm, preferably 0.1 to 1 μm, as well as radiopaque fillers such as ytterbium trifluoride or nanoparticulate tantalum(V) oxide or barium sulphate with a mean average particle size of from 10 to 1000 nm, preferably 100 to 300 nm.

So-called isofillers are further preferred. These are ground polymers which preferably contain an inorganic filler. Polymers which are obtained by polymerization of the above-defined radically polymerizable binders (binder a) are preferred. The above-named fillers and in particular silanized, highly dispersed silicic acids, glasses and radiopaque fillers such as ytterbium fluoride are preferred as inorganic fillers. Isofillers serve to increase the filler loading, to reduce the polymerization shrinkage and to control the consistency and aesthetics of the processed materials.

Preferred phase change agents are monomers with wax-like properties for setting the storage viscosity. The phase change agents bring about a phase change from solid (after depositing and cooling on the carrier) to liquid (liquefaction due to heat input by the laser). Preferred phase change agents are stearyl methacrylate, tris(2-hydroxyethylisocyanurate trimethacrylate as well as the wax-like polymerizable substances described in DE 196 26 356 A1.

By the storage viscosity is meant the viscosity which the materials have under usual storage conditions, i.e. in particular at room temperature (25° C.). A high viscosity at storage temperature reduces the sedimentation of pigments or fillers.

In order to obtain a homogeneous mixture, the phase change agent is preferably mixed with the remaining components above its melting point. For this, the phase change agent is preferably blended with the main body at room temperature first and then the mixture is heated under continuous stirring. All following steps are carried out at temperatures above the melting point of the phase change agent.

Preferred wetting agents are surfactants. These serve to set the surface tension and to set the interfacial tension between construction material and carrier, between support material and receiver and between support material and construction material. Through the setting of surface and interfacial tension it is ensured that the layer of the support material applied to the carrier does not contract (bulging effect), that it forms a homogeneous layer on the receiver and that the construction material does not contract on the support material (bulging effect). Preferred surfactants are conventional ionic (e.g. stearic acid), amphoteric (N,N,N-trimethylammonioacetate) and preferably non-ionic surfactants (polyalkylene glycol ethers (fatty alcohol ethoxylates (FAEO)). In addition to the interface-adapting function, certain surfactants, particularly the above-defined non-ionic surfactants, also have a support function.

Preferred stabilizers are methylhydroquinone (MEHQ) and 2,6-di-tert-butyl-p-cresol (BHT), hydroquinone (HQ) and (2,2,6,6-tetramethylpiperidin-1-yl)oxidanyl (TEMPO). Stabilizers primarily serve to improve the storage stability of the materials.

In addition, the reactive construction materials can contain further additives, in particular rheology modifiers, such as polyvinyl alcohol, hydroxyethyl cellulose, carboxymethyl cellulose, modified fat derivatives, polyvinylpyrrolidone; fragrances and flavouring agents, such as 2-benzylideneheptanal (amyl cinnamaldehyde), ethyl 2-naphthyl ether and essential oils. Furthermore preservatives with antimicrobial and fungicidal action such as polyformaldehyde, parabens such as 4-hydroxybenzoic acid methyl ester, 4-hydroxybenzoic acid butyl ester or salts thereof, micro- or nanoparticulate silver as well as propionic acid and salts thereof come into consideration as additives. Moreover, the compositions can contain solvents such as water or ethanol or corresponding solvent mixtures, fluoride-ion-releasing additives, optical brighteners and/or plasticizers as further additives.

The reactive construction materials preferably have the composition specified in the following table. All data are in wt.-% and are relative to the total mass of the construction material.

| Component | preferably | particularly preferably | quite particularly preferably |
|---|---|---|---|
| Binder (α) | 20-98% | 40-95% | 58-90% |
| Chromophoric component | 0-10% | 0.01-5% | 0.1%-2% |
| Energy transformation component (δ) | 0-5% | 0.001-2% | 0.05-1% |
| Volumeexpansion component (β) | 0.5-15% | 1-10% | 1.5-7% |
| Phase change agent | 0-10% | 0-8% | 0-5% |
| Filler | 0-78% | 0-50% | 0-40% |
| Initiator (γ) | 0.05-5% | 0.1-3% | 0.2-2% |
| Stabilizer | 0.001%-0.1% | 0.005-0.07% | 0.01-0.05% |
| Wetting agent | 0-2% | 0-1% | 0-0.5% |

According to a further embodiment of the invention unreactive construction materials which are based on metal or preferably ceramic particle suspensions in a liquid medium and which solidify by drying/vaporization after the selective depositing are preferred as construction materials. The liquid phase can be water, a solvent or a combination thereof. Such suspensions are also called slips in the following.

Slips preferred according to the invention are suspensions of zirconium oxide in a liquid medium which have a zirconium oxide content of from 68 to 88 wt.-%, preferably 70 to 86 wt.-% and particularly preferably 75 to 85 wt.-%.

The zirconium oxide in the suspension has in particular a particle size of from 50 to 250 nm, preferably of from 60 to 250 nm and particularly preferably 80 to 250 nm, measured as the $d_{50}$ value, relative to the volume of all particles. The determination of the particle size is effected in particular with the static laser scattering (SLS) process according to ISO 13320:2009, e.g. using an LA-960 particle size analyzer from Horiba, or with the dynamic light scattering (DLS) process according to ISO 22412:2017, e.g. using a Nanoflex particle measurement device from Colloid Metrix.

The primary particle size of the zirconium oxide lies in particular in the range of from 30 to 100 nm and it is usually likewise determined with a dynamic light scattering (DLS) process such as described above or by means of scanning electron microscopy.

The zirconium oxide is preferably zirconium oxide based on tetragonal zirconia polycrystal (TZP). Zirconium oxide which is stabilized with $Y_2O_3$, $La_2O_3$, $CeO_2$, MgO and/or CaO and in particular with 2 to 14 mol-%, preferably with 2 to 10 mol-% and particularly preferably 2 to 8 mol-%, of these oxides, relative to the zirconium oxide content, is preferred.

The zirconium oxide can also be stained. The desired staining is achieved in particular by adding one or more colouring elements to the zirconium oxide. The addition of colouring elements is sometimes also called doping and it is usually effected during the production of the zirconium oxide powder by co-precipitation and subsequent calcining. Examples of suitable colouring elements are Fe, Mn, Cr, Ni, Co, Pr, Ce, Eu, Gd, Nd, Yb, Tb, Er and Bi.

The zirconium oxide in the suspension can also be a mixture of zirconium oxide powders with different compositions, leading in particular to a different colouring and/or translucence in the dental restoration ultimately generated. The desired colour can thus be set easily and in a targeted manner with the aid of a mixture of differently coloured zirconium oxide powders. In the same way, the translucence of the generated object can also be set in a targeted manner through the use of a mixture of zirconium oxide powders with different translucence. The degree of translucence of the generated object can be controlled in particular through the yttrium oxide content of the zirconium oxide powders used.

The suspension can also be a mixture of different suspensions with, for example, differently coloured zirconium oxide.

The zirconium oxide is present as a suspension in a liquid medium. This liquid medium contains in particular water. In addition, it is preferred that the liquid medium has only small quantities of organic components and therefore contains organic components in a quantity of in preferably not more than 5 wt.-%, more preferably not more than 3 wt.-%, further preferably not more than 2 wt.-% and most preferably not more than 1 wt.-%, relative to the quantity of solid in the suspension.

In a further preferred embodiment the liquid medium contains organic components in a quantity of from 0.05 to 5 wt.-%, in particular 0.1 to 3 wt.-%, more preferably 0.1 to 2 wt.-% and most preferably 0.1 to 1 wt.-%, relative to the quantity of solid in the suspension.

In particular dispersants, binders, agents for setting the pH, stabilizers and/or defoamers come into consideration as organic components of the slip.

The dispersant serves to prevent the agglomeration of suspended particles to form larger particles. The quantity of dispersant in the liquid medium is in particular 0.01 to 5 wt.-%, preferably 0.1 to 2 wt.-% and particularly preferably 0.1 to 1 wt.-%, relative to the quantity of solid in the suspension.

Preferred dispersants for the slip are amino alcohols, such as ethanolamine, carboxylic acids, such as maleic acid and citric acid, and carboxylic acid salts, as well as mixtures of these dispersants. The slip preferably contains at least one dispersant, particularly preferably at least one compound selected from ethanolamine, citric acid and citric acid salt.

The binder of the slip promotes the cohesion of particles in the blank present after step (4). The quantity of binder in the liquid medium of the slip is in particular 0.01 to 5 wt.-%, preferably 0.01 to 3 wt.-% and particularly preferably 0.01 to 2 wt.-%, relative to the quantity of solid in the suspension.

Examples of suitable slip-binders are methyl cellulose, sodium carboxymethyl cellulose, starches, dextrins, sodium alginate, ammonium alginate, polyethylene glycols, polyvinyl butyral, acrylate polymers, polyethylenimine, polyvinyl alcohol and polyvinylpyrrolidone.

Preferred slip-binders are polyvinyl alcohol, polyvinyl acetate, polyvinylpyrrolidone, polyacrylic acid, copolymers of acrylic acid ester and acrylic acid, polyethyl acrylate, polymethacrylic acid, polymethyl methacrylate, ammonium polyacrylate, ammonium polymethacrylate, polyethylene glycol and solid copolymers of ethylene glycol and propylene glycol.

In particular, acids and bases, such as carboxylic acids, e.g. 2-(2-methoxyethoxy)acetic acid and 2-[2-(2-methoxyethoxy)-ethoxy]acetic acid, inorganic acids, e.g. hydrochloric acid and nitric acid, as well as ammonium hydroxide and tetramethylammonium hydroxide, come into consideration as agents for setting the pH and as stabilizers. It is preferred that the liquid medium contains tetramethylammonium hydroxide.

The defoamer serves to prevent air bubbles in the suspension. It is typically used in the liquid medium in a quantity of from 0.001 to 1 wt.-%, preferably 0.001 to 0.5 wt.-% and particularly preferably 0.001 to 0.1 wt.-%, relative to the quantity of solid in the suspension. Examples of suitable defoamers are paraffins, silicone oils, alkylpolysiloxanes, higher alcohols and in particular alkylpolyalkylene glycol ethers.

Because of the small proportion of organic components, these can also be burnt out of the blank within a short time.

To generate the suspension the zirconium oxide is typically intimately mixed with the liquid medium in powder form. Mixtures of for example differently coloured zirconium oxide can also be used. During this mixing, agglomerates which are usually present are broken up and the zirconium oxide used can also be ground in order to generate the desired particle size. The mixing of zirconium oxide and liquid medium can therefore be carried out advantageously in agitator bead mills, for example.

Furthermore thermoplastic materials, which solidify by cooling after the selective depositing, and combinations of the named materials, e.g. filled reactive systems, which solidify by cooling and can additionally be solidified reactively are suitable as construction materials. Preferred materials of this type are described in detail in EP 2 233 449 A1 and corresponding U.S. Pat. No. 8,133,831, which is hereby incorporated by reference, and EP 3 147 707 A1 and corresponding US 2018243176, which is hereby incorporated by reference.

Moreover the slips described in EP 2 151 214 B1 and corresponding U.S. Pat. No. 7,927,538, which is hereby incorporated by reference, are preferred. These contain surface-modified ceramic and/or glass ceramic particles. Sinterable glass ceramic particles based on leucite- or lithium disilicate-reinforced glasses and/or ceramic particles based on $ZrO_2$ or $Al_2O_3$, preferably pure $ZrO_2$ or pure $Al_2O_3$, particles based on $ZrO_2$ stabilized with $HfO_2$, CaO, $Y_2O_3$, $CeO_2$ and/or MgO, particles based on other metal oxides as well as ceramic composite materials which are produced from several oxides and are thus constructed from different crystalline oxide phases, preferably $ZrO_2$—$Al_2O_3$, in particular pure $ZrO_2$—$Al_2O_3$ or $ZrO_2$—$Al_2O_3$ stabilized with $HfO_2$, CaO, $Y_2O_3$, $CeO_2$ and/or MgO, are preferred.

These slips preferably contain a chromophoric component. Transition metal compounds are preferred as chromophoric component, in particular acetylacetonates or carboxylic acid salts of the elements iron, cerium, praseodymium, terbium, lanthanum, tungsten, osmium and manganese. The salts of the carboxylic acids acetic acid, propionic acid, butyric acid, 2-ethylhexylcarboxylic acid, stearic acid and palmitic acid are preferred. The corresponding Fe, Pr, Mn and Tb compounds are particularly preferred, such as e.g. iron(III) acetate or acetylacetonate, manganese (III) acetate or acetylacetonate, praseodymium(III) acetate or acetylacetonate or terbium(III) acetate or acetylacetonate as well as the corresponding carboxylic acid salts.

The chromophoric component is responsible for the colour of the ceramic after the debinding and sintering. If it absorbs laser energy and converts it into heat during the printing process, it is suitable in principle as energy transformation component. However, the quantity thereof is matched to the colouring and is therefore usually too small to bring about an energy transfer sufficient for the printing. In most cases, therefore, an additional energy transfer component is necessary. This is burnt out during the debinding and sintering and therefore has no influence on the colour of the sintered ceramic.

In all cases the construction materials preferably contain at least one volume expansion component, which makes it possible to print by means of LIFT.

The described construction materials are particularly suitable for combination with the support materials according to the invention.

After the solidification the support material must be removed from the shaped body residue-free without damaging the shaped body.

Depending on the construction material used, different methods such as dissolving in a suitable solvent and/or melting can be used here.

To remove the support material in the case of ceramic or metallic construction materials, the green body, with the surrounding support material, is preferably placed in the furnace directly, where the support material either melts and/or thermally decomposes and thereby separates from the ceramic green body. During debinding and sintering it is to be ensured that the support material combusts residue-free and the decomposition gases of the organic phase of the ceramic green body can escape unhindered. This can be achieved e.g. in that the support material melts or decomposes at lower temperatures than the remaining organic materials in the ceramic green body.

Alternatively the support material can be removed from the ceramic green body after the printing and before the debinding/sintering, as described for organic materials in the following.

If the printed components contain a "persistent", i.e. not to be burnt out, organic component in the construction material (e.g. composites, prosthetic base, tooth materials, auxiliary materials such as modelling materials, combustible materials for the lost-wax technique, impression trays, occlusal splints, drilling templates), the support material cannot be removed by combustion and therefore also need not be combustible completely residue-free. In these cases the support material is preferably removed by melting or dissolving in a solvent or water, optionally at increased temperature. Moreover it can be removed in a mechanical manner, e.g. by machine by vibratory finishing, or manually by ultrasonic cleaning or by spraying/washing off. Combinations of the named measures likewise come into consideration. For example, the support material can be softened by soaking in a solvent and then mechanically removed by machine or manually. In a particularly preferred embodiment the support material is melted and adhering support material residues are then removed using a solvent bath. The object is cleaned at the same time through the described measures.

The invention is explained in more detail below with reference to examples.

EXAMPLES

Examples 1 to 7: Production of Support Materials

The compositions specified in the following table were produced by mixing the components (all data in wt.-%):

| No. | 1 | 2 | 3 |
|---|---|---|---|
| Deionized water | 49.80% | 29.90% | 40% |
| Polyethylene Glycol 2000 g/mol | 50% | 50% | 35% |
| Polyethylene Glycol 200 g/mol | — | 20% | 10 |
| Safranin O (CAS 477-73-6) | 0.20% | 0.10% | 0.05 |
| Aquamatte 22 (oxidized PE wax microparticles with 6-8 um particle size and melting point 138° C.) | — | — | 15% |

| No. | 4 | 5 | 6 | 7 |
|---|---|---|---|---|
| n-Octanol | 10% | 10% | 15% | 10% |
| Paraffin wax (melting point 42-44° C.) | 89.90% | — | 74.90% | — |
| Paraffin wax (melting point 50-52° C.) | — | 89.90% | — | — |
| Sudan Black B (CAS 4197-25-5) | 0.10% | 0.10% | 0.10% | 0.2% |
| 1-Octadecanol | — | — | — | 89.8 |
| Orgasol 2001 UD NAT 2 (Polyamide 12 microparticles with 10 um particle size) | — | — | 10% | — |

Example 8: Production of Components by LIFT Process

Materials 1-3 were applied to a plasma-treated 50-μm-thick PET film separately using a doctor blade. Materials 4-7 were applied to the carrier (PET film) separately using a double slot nozzle heated to 60° C. and solidified again there. The carrier film thickness was 30 μm in all cases.

The carrier substrates were transferred into the working area of the laser and processed there within a maximum of 5 seconds. A neodymium: YAG laser with a wavelength of 1064 nm was used as laser. The coated carriers were fired at from behind through the carrier substrate with a laser pulse of 100 ns with a power of 12 mW, wherein the laser beam was focused on a spot with a diameter of 50 μm. Plasma-treated PET films with a thickness of 50 μm were used as receiver substrate. The droplets were deposited on the receiver substrate next to each other with an overlap of 0-30 μm, while the material film was continuously renewed on the carrier substrate. The distance between carrier substrate (site of droplet generation, i.e. the point at which the laser fires the droplets from the material film on the carrier substrate) and receiver substrate was 300 μm.

Materials 1-3 were dried on the receiver substrate with a constant airflow over the receiver substrate within 10 seconds until they solidify. Materials 4-7 solidified by cooling, and the volume expansion component evaporated slowly.

The support material was deposited on the receiver substrate at selected locations. The construction material was applied in the described manner in the free spaces not printed with support material.

Example 9: Production of Ceramic Components by LIFT Process

The aqueous $ZrO_2$ slip specified in the following table was produced by mixing the components in an agitator bead mill (MicroCer agitator bead mill, from Netzsch).

| Proportion [wt.-%] | Component |
|---|---|
| 80.95% | $ZrO_2$, stabilized with 3 mol-% $Y_2O_3$ (TZ-PX-245)[1] |
| 0.05% | 2-[2-(2-Methoxyethoxy)ethoxy]acetic acid (TODA) |
| 5% | PEG 10,000 |
| 0.1% | Safranin O (CAS 477-73-6) |
| 2% | Glycerol |
| 11.9% | Deionized water (dispersant) |

[1]Primary particle size 40 nm

The material was printed in the manner described in Example 8. The solidification of the construction material was effected by drying. In each case 5 layers of support material or construction material were deposited. Then the component was smoothed with a stainless steel roller to adapt the layer height. After the smoothing, a further 5 layers were applied and the smoothing step was repeated. This process was repeated until the completion of the printing process.

After completion of the printing process, the printed objects, which were completely surrounded by the support material, were placed in a sintering furnace and heated there at a heating rate of +1° C./min from room temperature to 500° C. During the heating, the support material melted and flowed out of the printed objects. The objects were then able to expand slightly at first and then contract without resistance during the debinding and sintering. Delicately adhering support material residues and the receiver substrate (PET film) decomposed residue-free in the further heating process. The green bodies were then debound completely and were able to be densely sintered by being heated at a heating rate of +10° C./min to 1500° C. and then sintered at 1500° C. for 1 hour.

After cooling to room temperature, 3D printed parts made of ceramic were obtained. The tests show that the process according to the invention is particularly suitable for producing dental restorations which very largely correspond in terms of appearance to natural teeth. The crown-type, ceramic components had no debinding cracks, were optically homogeneous and had a density of more than 99.5% of the theoretical density. The density was measured according to Archimedes' principle.

The invention claimed is:

1. A material for use as a support material for energy-pulse-induced transfer printing (LIFT) comprising
    0.05 to 30 wt.-% of at least one energy transformation component (a), which comprises an inorganic or organic dye or a pigment,
    5 to 60 wt.-% of at least one volume expansion component (b), which comprises a substance with a boiling point of from 95 to 200° C.,
    35 to 94.95 wt.-% of at least one binder (c), which comprises a polymer, wax and/or a non-ionic surfactant, wherein the polymer, wax and/or non-ionic surfactant is solid at <40° C.,
in each case relative to the total mass of the material, and
wherein the material has a viscosity at 25° C. of from 0.2 Pas to 1000 Pas and a surface tension at 25° C. of from 20 to 150 mN/m.

2. The material, according to claim 1 comprising
    0.05 to 20 wt.-% of at least one energy transformation component (a),
    8 to 50 wt.-% of at least one volume expansion component (b),
    40 to 90 wt.-% or 49 to 90 wt.-% of at least one binder (c),
in each case relative to the total mass of the material.

* * * * *